June 23, 1970 — D. A. KELLY — 3,516,245

CLOSED CYCLE-TANGENTIAL FLOW TURBINE

Filed March 11, 1969 — 3 Sheets-Sheet 1

INVENTOR.
Donald A. Kelly

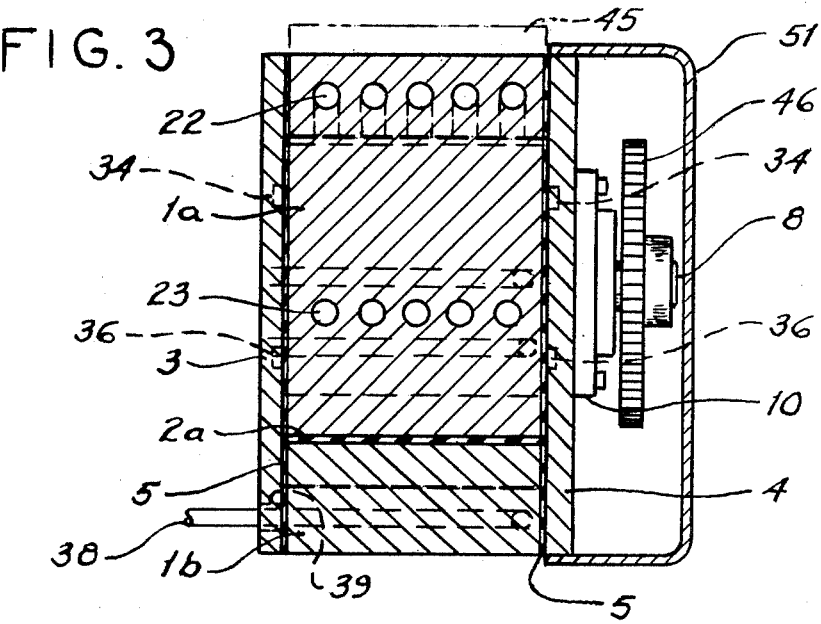
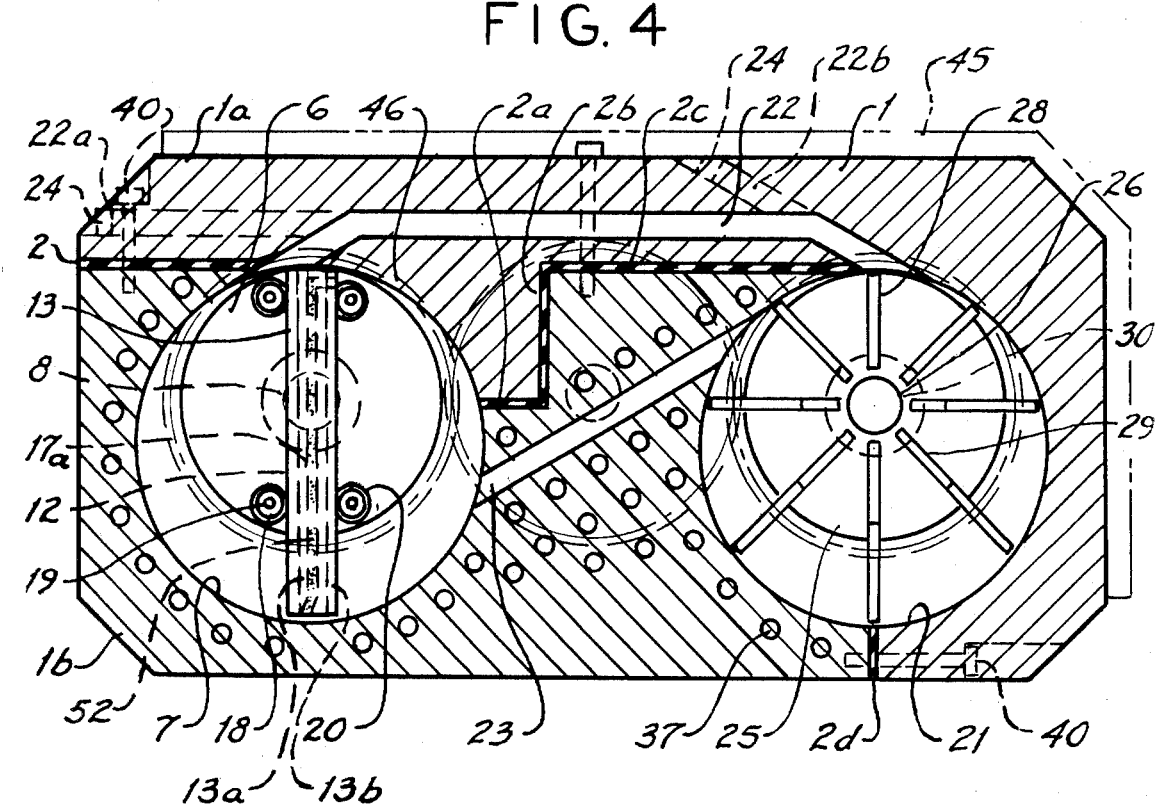

United States Patent Office 3,516,245
Patented June 23, 1970

3,516,245
CLOSED CYCLE-TANGENTIAL FLOW TURBINE
Donald A. Kelly, 58–06 69th Place,
Maspeth, N.Y. 11378
Filed Mar. 11, 1969, Ser. No. 806,183
Int. Cl. F03g 7/06; F25b 9/00
U.S. Cl. 60—24                                        7 Claims

ABSTRACT OF THE DISCLOSURE

The closed cycle tangential flow turbine is advocated as a compact, low-cost power source employing a minimum of simplified operating parts.

The tangential flow turbine is a Brayton cycle machine wherein a fixed volume of gas is cycled twice through a flow loop that enters and leaves the operating bores tangentially.

The modular construction greatly facilitates the economical forming of the flow loop through the isolated, alternate thermal sections.

---

This invention relates to a modified Brayton closed cycle turbine in which the compressor shaft and power shaft are parallel and geared together so that they rotate in the same direction and at nearly the same speed. The compressor and power bores are connected by multiple small transfer bores which enter and leave them tangentially or nearly so, so that a continuous gas flow loop is established. The T/F turbine is arranged in a modular form so that the transfer bores can pass through the alternate thermal sections conveniently, without the necessity of external ducting and connections. The modular block is split into irregular and unequal hot and cold sections insulated from each other and designed to establish the best possible thermal efficiency, by both analytical and empirical methods.

The purpose of double cycling in the T/F turbine is to partially cancel the negative torque required to compress the cold gas by the compressor stage vane, and in so doing reduces the torque loss within the T/F turbine system. Since the flat vanes of the power rotor do not provide the advantage of aerodynamic blade efficiency of the axial flow turbines, the double cycling method is adopted to provide reasonably good efficiency in a low cost modular turbine unit.

The double cycling is accomplished by the alternate placement of the thermal sections so that the circulating gas is twice alternately heated and cooled as it flows through the loop. The double cycling, in effect, induces a positive turning moment in both rotary sections which tend to offset the natural inefficiency of the power section.

The tangential flow turbine is a "water wheel" type of turbine which lends itself to forming the Brayton flow loop in a compact, modular form which will serve for various mobile power applications. Since the T/F type turbine does not have aerodynamic turbine blades, low cost rotors and plain vanes are utilized.

The compressor stage consists of a Ramelli pump type eccentric rotor and sliding vane. The vane is supported by eight ball bearings within the rotor to reduce reciprocating friction at the rotor slot.

The compressor sliding vane is not sealed at the ends and along the sides and revolves at close clearance with the bore and side plates. The compressor vane is guided by side bearings which revolve in circular grooves within the side plates.

The vanes of the power section are also guided in a similar manner to that of the compressor section, and revolve at close clearance to the bore and side plates.

The two sections, hot and cold, are completely insulated from each other by high temperature gaskets, so that no thermal loss occurs between them.

For convenience in manufacturing, the two operating bores and the hot and cold transfer bores would be machined into the single block before the separation cuts are made. The starting points of the transfer bores would be plugged at the outside, to maintain the integrity of the gas flow loop. This method of construction would simplify the machining set-up and reduce costs without any sacrifice to the cycle efficiency.

The compressor vane is provided with zig-zag regenerator bores for efficient thermal storage between the thermal halves. Inlet ports would be located at one extremity of each bore on the face of the vane, and outlet ports on the opposite extreme end, so that effective transfer from one thermal half to the same half is maintained.

The regenerator bores are fitted with regenerative filament to implement heat storage while minimizing gas flow resistance. In operation, the filament would pick up heat as the displacer vane sweeps into the hot section, stores it as the vane sweeps through the cold section and releases it as the vane just enters the hot section. It must be noted that the total length of the zig-zag regenerator bores within the compressor vane must be equal to half the port arc circumference so that a balanced thermal storage and transfer will be achieved.

The engine, as a closed cycle machine, must be provided with high temperature dry film lubricant and low friction seals so that no internal circulating oil system is required.

The two shafts of the two operating sections are connected by three equal, or nearly equal, diameter spur gears so that the same direction of rotation is realized. The center idler gear is supported by two bearings within a support flange.

The two shafts must be sealed on the outside of the bearings with low-friction seals which are mounted in flanges secured to the side plates.

A cover housing protects the gearing and bearings from dirt and contamination and is secured to the modular housing.

Variations may be made in the shape of the separation cut to suit the thermal requirements of each of the two operating sections. The shape of the cut must be such that the two sections can be readily assembled with no difficulty in the placement of insulating gaskets.

The multiple transfer bores connecting the two operating bores are made small in diameter so that heat may be rapidly transferred to or from them. The changes in direction of the small bores are made at shallow angles and are smooth to minimize flow resistance. If necessary, one-way flow valves may be installed in all the bores to insure gas flow in only one direction.

The multiple transfer bores may be increased or decreased in length to provide the necessary heat transfer rate, and are not dependent on the operating bore sizes, but are determined by the overall module size. The transfer bores enter and leave the operating bores tangentially for smooth gas flow and transfer effectiveness.

Heating for the turbine hot section may be provided by a low emission burner fueled by kerosene, fuel oil, or other suitable fuel.

Cooling for the turbine cold section would be provided by a circulating liquid cooling system.

It is an object of the invention to provide a compact, low-cost closed cycle turbine utilizing a minimum number of simplified parts.

It is an object of the invention to achieve maximum operating economy by the application of rotary regeneration techniques.

It is a final object of the invention to produce an efficient closed cycle turbine with a minimum of maintenance necessary.

It should be understood that variations may be made in the detail design without departing from the spirit and scope of the invention.

Referring to the drawings:

FIG. 3 is a side section through the tangential flow turbine.

FIG. 4 is an alternate front section.

Figure 1:
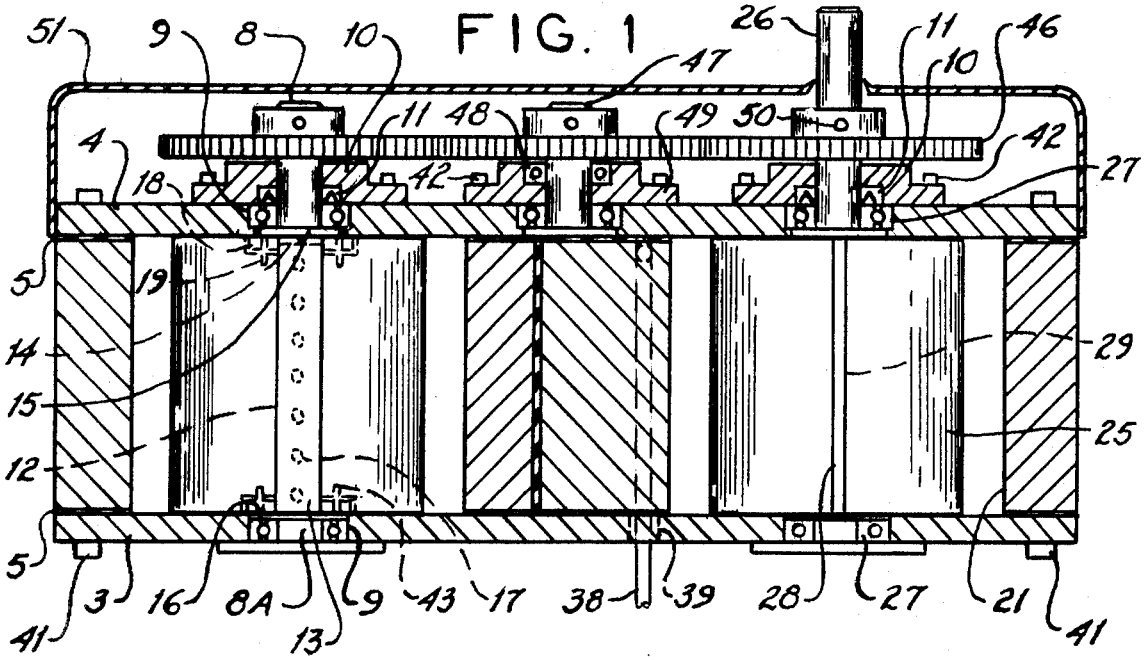
FIG. 1 is a top section view through the tangential flow turbine.
Figure 2:
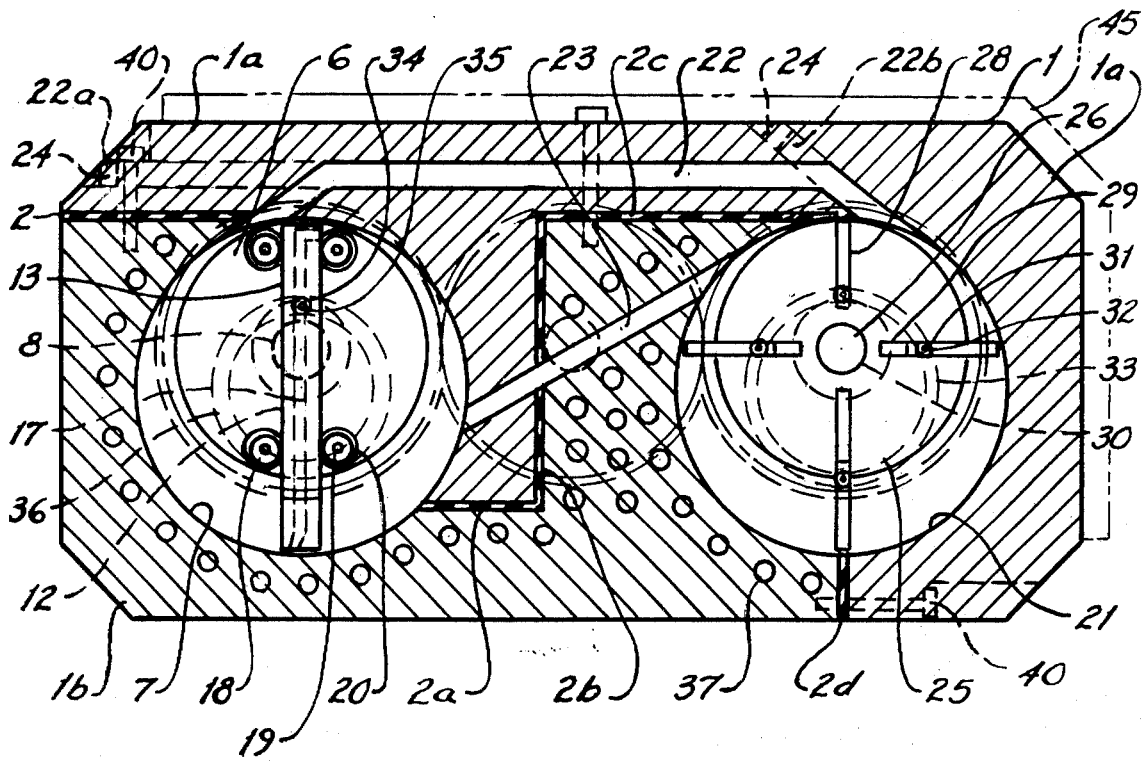
FIG. 2 is a front section through the tangential flow turbine.
Figure 5:
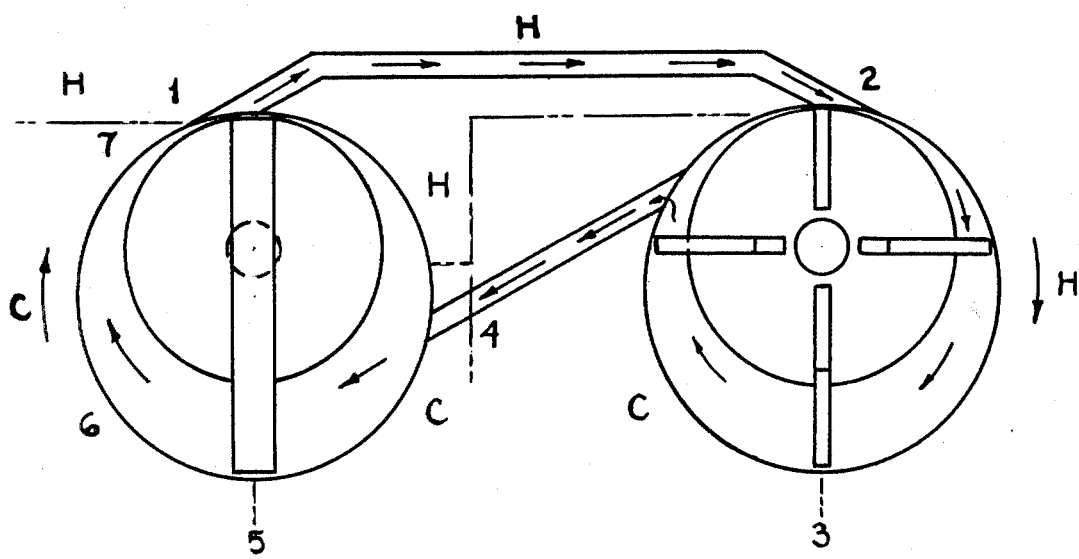
FIG. 5 is a schematic of the tangential flow turbine.
Figure 6:
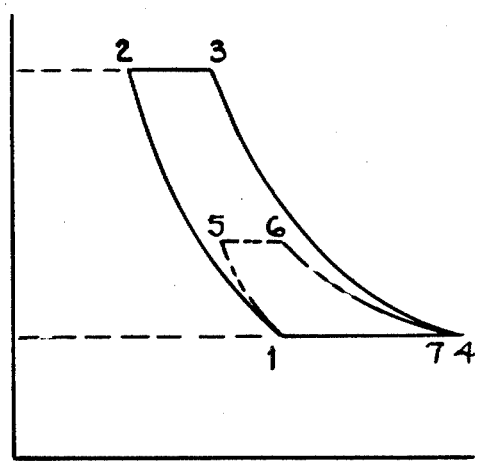
FIG. 6 is a cycle diagram of the turbine. (Brayton cycle.)

Referring to the drawings in detail:

The modular block 1 is divided into two sections, one hot section 1a and a cold section 1b, which are nearly equal in volume. The sections are insulated from each other by the insulating gaskets 2, 2a, 2b, 2c and 2d, and secured with the bolts 40. The side plates 3 and 4 are secured to the modular block 1, by the screws 41 and insulated from it by the insulating gaskets 5.

The compressor rotor 6 closely fits and revolves in the compressor bore 7, which is equally placed between the hot section 1a and a cold section 1b. The compressor rotor 6 is supported by the shafts 8 and 8A, and the two bearings 9, secured within the side plates 3 and 4.

The retaining flanges 10, carry the shaft seals 11 which pressure-seal the shafts in the modular block 1.

The retaining flanges 10 are secured to one side plate 4 with the screws 42 with special sealant used to insure a pressure-tight seal at the joints.

The compressor rotor 6 has a diametrical slot 12 through its center which provides clearance for the movement of the compressor vane 13. The slot 12 nearly divides the rotor 6 in half except for the tie piece 14 at one end.

The shaft 8 has a base flange 15 which is secured to the compressor rotor 6 end by the screws 43. The shaft 8A also has a base flange 16 which is secured to the opposite end of the rotor 6 by the screws 43.

The compressor vane 13, is provided with internal regenerator bores 17 which are zig-zagged to provide the necessary flow path. The vane 13 may be split down the width in order to facilitate the machining of the regenerator bores 17.

The ball bearings 18 are recessed into the compressor rotor 6, and supported by the pins 19 within the recesses 20.

The ball bearings 18 closely guide the reciprocation of the compressor vane 13 and equally protrude into the diametrical slot 12, so that the vane 13 never touches the slot walls.

The power bore 21 is located adjacent to the compressor bore 7 within the modular block 1. The two operating bores 21 and 7 are connected together by the multiple transfer bores 22 and 23. The transfer bores 22 are the hot flow bores and 23, the cold flow bores. The entrance bores 22a and 22b are sealed with the threaded plugs 24. An equal number of hot and cold transfer bores 22 and 23 are required, and these do not interfere with each other when machined.

The power rotor 25 closely fits and revolves in the power bore 21 and is supported by the output shaft 26 and two roller bearings 27, located in the side plates 3 and 4.

The power vanes 28 are closely fitted into the slots 29 within the power rotor 25 and are free to move radially within these slots. The power rotor 25 has a center bore 30 into which the output shaft 26 closely fits.

The power vanes 28, are guided in their radial displacement by two ball bearings 31 fixed at the vane lower sides and supported by the pins 32. The ball bearings 31 revolve in grooves 33 located on the inside faces of the side plates 3 and 4. The grooves 33 are made concentric to the power bore 21 and guide the vanes 28 at close clearance to the power bore 21 to insure maximum utilization of the expansion force.

The compressor vane 13 is also fitted with two ball bearings 34 fixed at the vane lower sides and supported by the pins 35. The ball bearings 34 revolve in the grooves 36 located on the inside faces of the side plates 3 and 4.

The cold section block 1b of the modular block 1 contains multiple liquid cooling holes 37 running through the width of the block 1b, and arrayed around the two cold half sections of the compressor bore 7 and power bore 21. A large number of coolant holes 37 must be provided consistent with the structural integrity of the cold block 1b. The entrance and exit portions of the holes 37 will be threaded to receive the connecting tubes 38 which connect to the external coolant circulating system. Clearance holes 39 will be provided in the side plates 3 and 4 for the passage of the connecting tubes 38.

The hot section block 1a is fitted with a low-emission burner 45 which is L shaped to match the heating area requirement of the hot block. The burner 45 may be of any external size and interior arrangement, but must be placed in close contact with the heated surface of the hot block 1a.

Three spur gears 46 are secured to the shafts 8 and 26 and the idler shaft 47. This arrangement allows the two stages to rotate at the same speed and in the same direction so that the T/F turbine functions properly.

The idler shaft 47 is supported by two ball bearings 48 and flange 49. The flange 49 is secured to the side plate 4 with the screws 42.

The gears are locked to their respective shafts by the pins 50. A removable cover 51 encloses the gear assembly to provide dirt exclusion and protection of these components.

An alternate compressor vane 13 arrangement would consist of two metal vanes 13a with fiberglass laminations 13b bonded to both faces of each of these metal vanes. The two built-up vanes are then joined by a hollow honeycomb-like core which forms the multiple zig-zag regenerator bores 17a. This arrangement provides thermal isolation of the transient gas flow from either of the two thermal zones of the compressor bore 7.

The regenerator bores 17a are provided with fine mesh regenerative filament 52, uniformly dispersed throughout their lengths.

What is claimed is:

1. A closed cycle tangential flow turbine comprising an engine block divided into two nearly equal sections, two large parallel bores disposed within said engine block, multiple small bores disposed at right angles to said large bores freely communicating with the said two large parallel bores forming a gas flow loop, a compressor rotor eccentrically placed in one of the said two large parallel bores and containing a wide diametrical slot, a wide compressor vane freely revolving in one of the said two large parallel bores, multiple non-linear regenerator bores uniformly dispersed within the said multiple non-linear regenerator bores, two flanged shafts disposed at each end of the said compressor rotor and supported by bearings eccentrically placed in one of the said two large parallel bores, a power rotor eccentrically placed in the other of said two large parallel bores and containing multiple radial slots, a through center hole disposed within the said power rotor, multiple power vanes in sliding association with the said radial slots of the power rotor, an output shaft secured within the said through center hole of the said power rotor supported by bearings eccentrically placed in the other of the said two large parallel bores, two side plates with gaskets secured to and sealing the said engine block, sealing means disposed within one of the said side plates where the shafts protrude from the said engine block.

2. A closed cycle tangential flow turbine according to claim 1 in which the said multiple non-linear regenerator bores uniformly disposed within the said wide compressor vane are nearly equal in length to one-half the circumference of the revolving said wide compressor vane length, multiple parts corresponding to and intersecting the said regenerator bores uniformly disposed on the face near one end of the said wide compressor vane.

3. A closed cycle tangential flow turbine according to claim 1 in which one of the two nearly equal sections of the engine block contains multiple cooling holes uniformly and width-wise disposed throughout the block volume.

4. A closed cycle tangential flow turbine according to claim 1, in which the said shafts protruding from the said engine block are each provided with a large spur gear, a third spur gear meshing with the two said spur gears and supported by an idler shaft mounted on a said side plate, a cover disposed over the gear assembly and secured to the said engine block.

5. A closed cycle tangential flow turbine according to claim 1, wherein the said wide compressor vane is fitted with ball bearings at the lower sides in rolling association with a grooved circular track in each of the said side plates, the said multiple power vanes are fitted with ball bearings at the lower sides in rolling association with a grooved circular track in each of the said side plates, the said compressor rotor is fitted with eight ball bearings in close alignment with the said wide diametrical slot, the said compressor vane reciprocates freely on said eight ball bearings.

6. A closed cycle tangential flow turbine according to claim 1, in which the said engine block is provided with thermal insulation means between the said two nearly equal sections, external insulated bolting means provided to join the said two nearly equal sections.

7. A closed cycle tangential flow turbine according to claim 1, wherein one of the two nearly equal sections of the engine block is fitted with a multi-fuel low emission burner in close contact with the entire exposed surface of the engine block section.

References Cited

UNITED STATES PATENTS

| | | | |
|---|---|---|---|
| 2,044,330 | 6/1936 | Richter | 62—6 XR |
| 3,370,418 | 2/1968 | Kelly | 60—24 |
| 3,426,525 | 2/1969 | Rubin | 60—24 |

FOREIGN PATENTS

| | | |
|---|---|---|
| 962,996 | 12/1949 | France. |
| 1,528,939 | 5/1968 | France. |

MARTIN P. SCHWADRON, Primary Examiner

R. R. BUNEVICH, Assistant Examiner

U.S. Cl. X.R.

62—6